United States Patent [19]

Bansal et al.

[11] 4,247,320

[45] Jan. 27, 1981

[54] GLASS CONDITIONING

[75] Inventors: Bihari Bansal, Wellsboro, Pa.; George B. Boettner, Corning, N.Y.

[73] Assignee: Corning Glass Works, Corning, N.Y.

[21] Appl. No.: 75,650

[22] Filed: Sep. 14, 1979

[51] Int. Cl.³ .............................................. C03B 7/04
[52] U.S. Cl. ..................................... 65/136; 65/137; 65/327; 65/337; 65/346; 65/347
[58] Field of Search ............... 65/136, 137, 337, 346, 65/347, 327

[56] References Cited

U.S. PATENT DOCUMENTS

| | | | |
|---|---|---|---|
| 2,008,495 | 7/1935 | Ferguson | 65/347 X |
| 3,244,495 | 4/1966 | Apple et al. | 65/347 X |
| 3,607,184 | 9/1971 | Williams | 65/327 X |
| 3,951,635 | 4/1976 | Rough, Sr. | 65/136 X |
| 4,040,795 | 8/1977 | Jung | 65/347 X |

*Primary Examiner*—Arthur D. Kellogg
*Attorney, Agent, or Firm*—John P. DeLuca; Burton R. Turner

[57] ABSTRACT

In an apparatus for conditioning a supply of molten thermoplastic material, preferably glass, a chamber in flow communication with the supply of glass is mounted for rotation about an axis. The chamber has a flow control surface having at least two regions, each uniquely oriented for influencing the flow of the molten glass therealong. In one region the glass experiences delayed flow to enable it to give up heat and in a region downstream of the first, the glass experiences accelerated flow to enable it to counteract changes in viscosity resulting from previous heat loss. The chamber is rotated so that a fresh supply of glass at an elevated temperature is deposited circumferentially on the flow control surface in order to moderate the influence of heat loss as the glass flows through the chamber.

25 Claims, 6 Drawing Figures

GLASS CONDITIONING

BACKGROUND OF THE INVENTION

This invention pertains to a method and apparatus for cooling and conditioning glass in preparation for forming processes. In particular there is disclosed a method and apparatus adapted for the manufacture of tubing. However, the invention described herein would be suitable for other glass forming processes as well.

A forehearth may be defined generally as a covered refractory channel in which glass is cooled and conditioned prior to forming. Such devices or structures have been in general use in the glass industry for many years. However, they leave much to be desired from the point of view of construction cost, energy consumption and operating performance.

The construction and repair costs of modern forehearths have increased to the point that such expenditures are a substantial portion of the total investment in the furnace. Thus, any reduction in this outlay would be a desirable advantage.

Forehearths are primarily intended to remove heat from glass, but the anomaly exists that, in order to properly condition the glass prior to forming, substantial amounts of energy must be selectively added. Accordingly, energy is wasted in order to regulate a waste heat operation.

Finally, since forehearths are relatively complex devices with long time lags, a great degree of art and skill is required to obtain optimum temperature uniformity at the exit end where forming takes place.

In a conventional forehearth, illustrated in FIG. 1, glass enters at the left and flows towards the orifice at the right. A typical cooling curve is illustrated in the same Figure showing temperature T vs. the distance D from the forehearth orifice. The surface glass temperature is significantly cooler than the bottom glass. Thus, heat is applied in order to condition the glass, with the objective of producing a more uniform glass temperature profile. There are many interactional effects, and thus, only partial uniformity is accomplished by trial and error.

The typical forehearth of the prior art has a relatively narrow width (W) in comparison to its length (D) and the velocity distribution of the glass varies from about twice the average velocity in the center of the channel on the surface (see FIG. 1 top view) to near zero at the sidewall. In order for the glass to remain at the uniform temperature, the heat loss must vary in proportion to the velocity. This is usually never accomplished naturally and the glass along the sidewall becomes cold. Side and surface glass may be heated with electrically energized submerged electric side heaters and overhead burners. This additional energy must be dissipated before the glass enters the orifice and thus the forehearth needs to be longer in order to handle the greater heat load. Thus, in order to condition the glass to a uniform temperature, heat energy input is required while at the same time heat is removed.

A number of systems are available in the prior art for conditioning glass prior to formation. One such invention of Lufkin, U.S. Pat. No. 2,038,797, illustrates a rotating reservoir fired by burners having an outlet portion wherein glass may be removed by hand or by other machinery. This system requires energy input to maintain the temperature of the glass within the rotating reservoir. Kadow, U.S. Pat. No. 1,815,258 shows a rotating cone and a reservoir portion upstream of forming means. This system requires one or more burners with which to maintain stable high temperature in the reservoir portion. Soubier, U.S. Pat. No. 1,967,378 is a system similar to Kadow and requires burners to maintain the heat.

A number of patents show systems wherein glass overflows a curb or forming ledge portion of a tube drawing apparatus. Some systems rotate while others do not. Typical examples are shown in other U.S. Pat. Nos. such as Favre, 1,899,891; Richardson, 1,933,341; Cardot, 1,949,037; Gray 2,133,662, and Weber, RE. 20,522. A significant problem with some of these devices, especially ones that have a rotating reservoir, is that the outlet orifice which is contiguous with the overflow curb receives an inordinate amount of wear, and it is difficult to control the wall thickness and minimize eccentricity of the tubing. Similarly U.S. Pat. Nos. to Howard, 1,823,543 and Soubier, 1,750,972 show systems where glass is formed by means of a mandrel and a rotating orifice, the former having a funnel-like outlet and the latter having a reservoir portion upstream of a tapered orifice. These systems suffer from the same problems of the previous group and also from the problem that it is difficult to maintain the mandrel forming device in the orifice concentrically with a rotating reservoir or funnel. Further, these systems do not approach the problem of conditioning the glass temperature to the extent of the present invention.

All the aforementioned systems, except for the Howard '543, require a pool or annular zone wherein glass is maintained in a reservoir-like structure. One of the problems with pool systems is that the bottom glass may become too cool to move, stagnant and devitrify. If the bottom glass does not move through the system, hot glass, which has not had the sufficient time to lose excess heat energy will short circuit flow to the orifice. Thus, glass and energy is wasted. In the somewhat different system of Howard, despite the claim that flow will be uniform, the glass will accumulate down stream near the orifice. Moreover, Howard is not designed for, nor does it address the problem of glass conditioning, since this is presumably accomplished in the forehearth section above the funnel.

Weber '522 discusses the conditioning of glass using a heat exchanger to control the temperature of the interior of a drawn tube, while leaving the glass near the overflow curb hot. The cooling device or heat exchanger near the outlet orifice helps to quickly harden the glass as the tubing is formed and has relatively little to do with the conditioning of the glass prior to formation.

It is important to note that the present invention allows for a better application of a tube drawing process known as the "VELLO" process. In a conventional draw, an overflow is provided to eliminate a cord known as a "VELLO streak" caused by asymmetries in the temperature, flow and possibly composition of glass about the bell shaft. The overflow is not without its own problems, such as, producing a nonuniform head of glass above the orifice, thus, making it difficult to control tubing wall thickness and quality. As will be hereinafter described, the present invention provides a means whereby an improved tube draw may be utilized.

The present invention seeks to avoid some of the problems of the aforementioned prior arrangements and its object and functions are summarized below.

SUMMARY OF THE INVENTION

Apparatus has been disclosed for condition a supply of molten viscous material to at least one of a plurality of desired temperature and viscosity characteristics, wherein a delivery means conveys a stream of the material from a supply. The system comprises a chamber in flow communication with the delivery means. The chamber is mounted for rotation about an axis and has an inlet for receiving the stream of material therein and an outlet remotely located from and in flow communication with the inlet. The material is conditioned within the chamber and is allowed to flow therefrom at a relatively uniform temperature and viscosity. A flow control surface joins the inlet and outlet of the chamber and has a profile including at least two regions, each uniquely oriented for influencing the flow of material therealong. In one region the material experiences delayed flow to enable it to give up heat to the ambient, and in another region the material experiences accelerated flow to enable it to counteract changes in viscosity resulting from initial heat loss in the first mentioned region. Means is provided which operatively couples the chamber for rotation about the axis, such that, a fresh supply of material is deposited circumferentially on the flow control surface in a relatively even distribution. The fresh supply of material is at an elevated temperature and carries with it a supply of heat energy which moderates the influence of the heat given up by the material under the influence of the flow control surface. Thus, the material reaches the outlet at a desired temperature and viscosity. The system provides little or no heat input for conditioning the molten viscous material other than that provided by the fresh supply of molten material. A heat exchanger may be provided in order to control the rate of heat removal from the material.

While the preferred embodiment will be described with respect to a tube drawing process, it will be clear from the forthcoming description that other forming apparatus may be supplied utilizing the forehearth arrangement of the present invention.

DESCRIPTION OF THE PREFERRED EMBODIMENT

Figure 2:
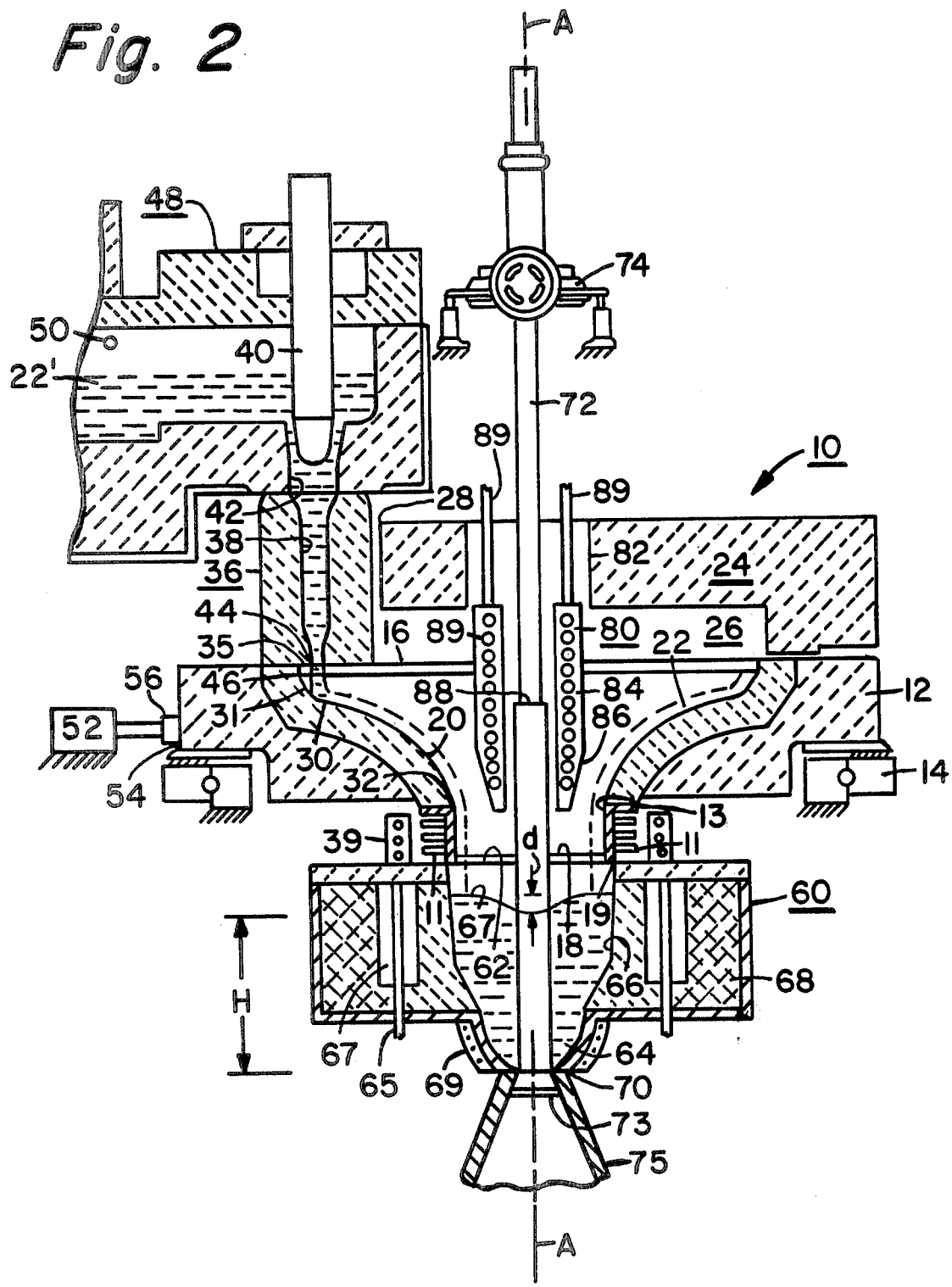
FIG. 2 is a side sectional elevation of a preferred embodiment of the present invention specifically designed for the formation of tubing.

FIG. 2 illustrates in vertical side section a glass conditioning apparatus 10 of the present invention, sometimes referred to hereinafter as forehearth 10. A chamber 12 is mounted for rotation on bearing supports 14 about a vertical axis A. The chamber 12 has an inlet portion 16, an outlet portion 18 in flow communication therewith and a formed surface 20 for supporting and affecting a flow of molten viscous material 22 thereon (hot glass). A cover 24 extends over the inlet 16 and provides an enclosure for a space 26 over the chamber 12. The cover 24 helps to create a stagnant atmosphere in the space 26. Volatilization of glass components is thus significantly reduced since the volatiles become trapped and the atmosphere is saturated, thereby inhibiting further volatilization. The cover 24 has an opening or cut away 28 by which means may be provided for allowing or delivering molten material 22 therein.

Molten material 22, sometimes hereinafter referred to as glass, is delivered at the inlet 16, flows over the formed surface 20 to the outlet 18 and is conditioned enroute. The formed surface 20 includes at least two regions 30 and 32 each oriented for influencing the flow of the material 22 thereon. A first region 30 receives the thermoplastic material 22 in such a way that it tends to dwell prior to flowing inwardly along the surface 20 and the second region 32 in communication with the first region 30 is fairly steep and allows the material 22 to flow as rapidly even as it cools for discharge from the system.

The first region hereinafter called dwell 30 may include a peripheral inclined plane portion or wedge 31 in flow communication with a delivery means 36. The latter includes a delivery tube 38 having a needle 40 located in an upper seat assembly 42. The delivery tube 38 has an outlet 44 from which a stream 46 of the material 22 issues against wedge 31. Stagnation of the material flowing into the dwell 30 is inhibited by the wedge 31, urging it inwardly of the chamber 12 and not allowing it to collect in what otherwise would be a tight corner from surface 20 to upper edge 35 of chamber 12. The wedge 31 assists in the transformation of the supply of material from the downflowing stream 46 onto a relatively thin film 22. Use of wedge 31 allows for a wider working range of rpm of the chamber 12 by modifying the centrifugal force imparted by the chamber rotation and the downward force of the stream 46 as it enters the chamber at dwell 30. That is, a portion of the force supplied by the falling stream 46 is imparted radially inward of the chamber to start the glass moving towards the outlet 18, and thus, the speed of rotation may be adjusted to regulate film formation characteristics. The delivery outlet 44 preferably has a circular cross section, which has been found to be useful in film formation. An oblong delivery outlet could be used having an aspect ratio of about 2 or 3 to 1 in the radial direction.

The delivery means further includes a relaively short structure known as a short length or stub forehearth 48, hereinafter stub 48. An upstream supply of the thermoplastic material 22' is enclosed within the stub 48 and a burner 50 may be used to maintain the temperature of the glass 22' therewithin. Other delivery systems might be provided in the present invention and it is only necessary that a reliable and controllable stream of thermoplastic material is supplied to the inlet 16 of the chamber 12.

Figure 3A:
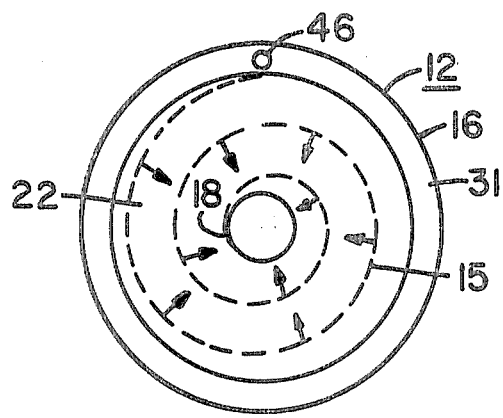
FIGS. 3a and 3b show schematical flow of material through the apparatus as a function of chamber rotation.
Figure 3B:
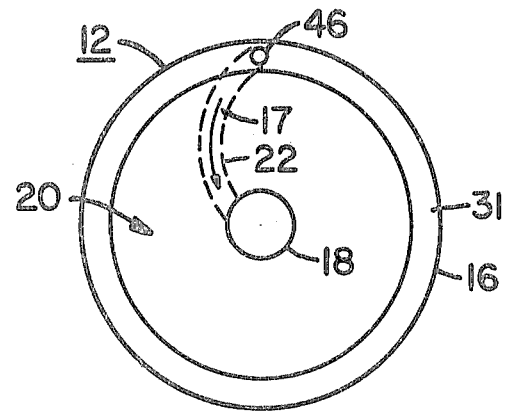

A drive 52 is operatively coupled to an exterior peripheral side portion 54 of chamber 12 by means of a drive and ring gear assembly 56 shown schematically. The drive 52 causes the chamber 12 to rotate about the axis A at a controlled rate, which for the purposes of the present invention might be from about 0.5 to about 20 rpm. Although more or less rotational speed may be imparted to the chamber 12 a preferred rate of rotation for an approximately 6 foot diameter chamber is from about 3 to about 7 rpm. Optimum results have been achieved in modeling at 5–6 rpm. so that imaginary helix 15 is formed (see FIG. 3a). The drawing illustrates the relatively uniform flow of material 22 radially towards outlet 18 from each portion of the helix 15 (see arrows). The result of very slow rotation is illustrated in FIG. 3b, wherein, the material 22 short-circuit-flows to outlet 18 along front 17. Rather than film over surface 20 evenly, the glass 22 will short circuit from the inlet 16 to the outlet 18. Fast rotation of chamber 12 (e.g. about 14 rpm or more) will cause blister trapping which is undesirable.

As the stream 46 of material 22 is deposited on the dwell 30 of chamber 12 it begins to move slowly along the formed surface 20 towards the second region sometimes hereinafter referred to as discharge 32. A portion thereof is clad with a protective metal (e.g. platinum) sleeve 13 which has a peripheral lip 19 which extends downwardly to prevent buildup of glass 22 as it leaves discharge 32. Fins 11 impart good heat transfer characteristics to sleeve 13. Heater 39 may be used to heat sleeve 13 by radiative heat coupling. The heater 39 may take the form of an annular fixed position refractory ring carrying heater coils. As the material 22 cools it becomes more viscous and slow moving by the time it reaches the discharge region 32, but since it has a steeper profile than the dwell 30, discharge 32 allows the cooled glass 22 to maintain velocity rate towards the outlet 18. Thus, the profile of the formed surface 20 and heat supplied by fresh glass, hereinafter discussed, counteracts the increased viscosity caused by cooling.

Figure 4:
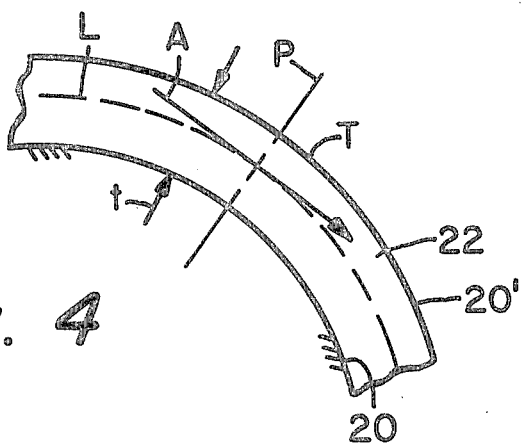
FIG. 4 is a schematic illustrating flow along a formed surface.

Because of the shape of the formed surface 20 the material 22 has a tendency to flow evenly thereover and form the film illustrated in FIG. 4. The material 22 forms a film over surface 20 of relatively uniform thickness t and temperature T at the position P. The flow axis of the material 22 at position P is illustrated by arrow A tangent to flow line L. The temperature gradient of the film is close to zero (i.e. almost uniform) from the formed surface 20 to the exposed upper surface 20' of glass 22.

The hot stream 46 acts as a temperarture moderator for the chamber 12 by carrying with it heat energy to be dissipated in the glass conditioning apparatus 10. The energy carried by the material 22 is radiated therefrom and is absorbed and reradiated by the chamber 12 and cover 24. Thus, the heat carried in by the material 22 is redistributed more uniformly as the material 22 moves through the chamber 12 without additional energy input.

An important and useful application of the present invention is a tube forming apparatus 60 having an inlet end 62 and an outlet forming end 64. The forming apparatus 60 sometimes hereinafter referred to as draw 60, includes a refractory reservoir portion 66 for enclosing a supply of the material 22 therein. As the material 22 flows from the inlet end 62 to the forming end 64 it is maintained at a rather uniform temperature by insulation 68 surrounding the reservoir 66. Heaters 65 in the form of glow bars are located in a space 67 between refractory vessel 66 and insulation 68. Outlet heaters 69 may be located as shown at forming end 64. The heaters 69, 65 and 39 mentioned above may be used for startup and idle periods to bring the apparatus to proper operating temperature as well as during operation to add heat for control purposes. The latter use would not be implemented very much, if at all, under normal operating conditions.

The forming end 64 includes an orifice 70 and a bell 73 carried on bell shaft 72. The arrangement shown is a tube drawing device wherein tubing 75 may be drawn continuously from forming end 64. The belt shaft 72 is supported from above by an adjustable supporting member 74 along the axis A of chamber 12. Thus, the present invention provides a source of thermoplastic material having a relatively uniform temperature and viscosity which is more readily formed into dimensionally stable tubing or other types of formed glass products.

The head H of glass in the reservoir 66 experiences some draw down d along the upper surface 67 near bell shaft 72 but it is symmetrical thereabout. Thus the head H above oridice 70 is uniform and provides stability to the draw 60. This feature when considered with the uniform temperature and viscosity of glass 22 upon entry into reservoir 66 improves the draw 60 greatly.

By controlling the feed and pull rate of draw 60, the head H may be held relatively uniform. Head control could thus be used as a tube draw parameter with the advantage of positional accuracy.

The bell shaft 72 carries a heat exchanger 80 thereon. The heat exchanger 80 is movable upwardly and downwardly as the adjustable support device 74 is activated. An opening 82 is provided in the cover 24 so that the heat exchanger 80 may be fully inserted or retracted for establishing heat exchange relationship with the glass 22. The heat exchanger 80 may have one of many shapes which is compatible with an interior portion of the chamber 12 and the formed surface 20. In this particular illustration the heat exchanger 80 includes a vertical cylindrical portion 84 and a contiguous distal conical section 86 which may be lowered into and in close proximity with the discharge 32 near outlet 18. The heat exchanger 80 may be air or water cooled as desired. It may move independently of the bell 74 at the lower end, since the bell shaft 72 may be telescopically coupled to the adjustable support 74 at sleeve portion 88. Fluid passages 89 provide for the circulation of heat exchange fluid into, coiled about and out of the heat exchanger 80. The fluid is preferbly water because of its high heat capacity. Flow control of the fluid can be used to regulate the cooling rate as desired.

Figure 1:
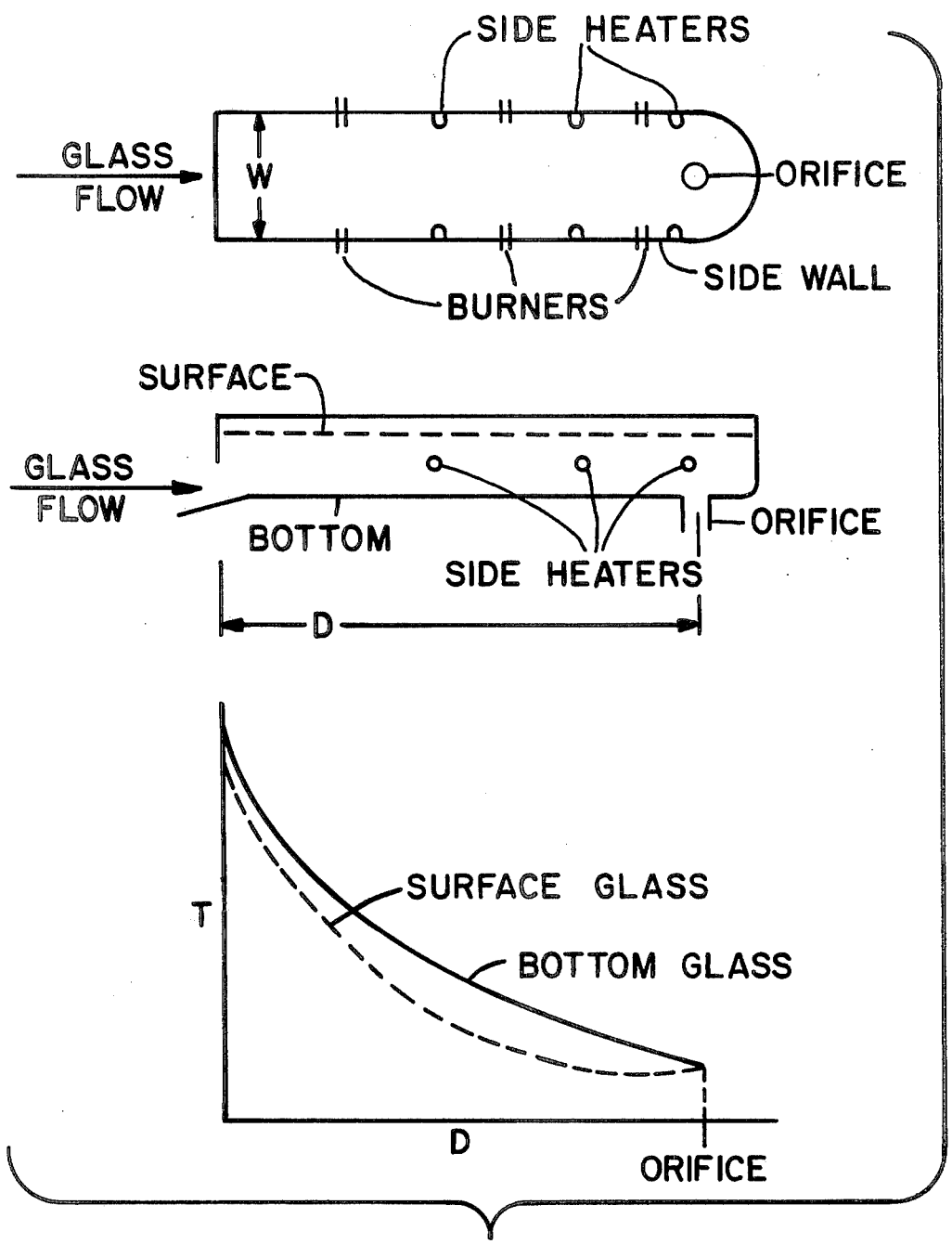
FIG. 1 is a combined drawing showing labeled side and top elevations of a conventional forehearth and a temperature vs. forehearth length profile of the material within such a system.

The heat exchanger is useful since it assists in the natural cooling which occurs within the chamber 12 and, very importantly, its use allows for the construction of a smaller forehearth with a uniform and minimal residence time for virtually all the glass. For example, the forehearth 10 may be 6' in diameter and allow for a 2–3 minute glass residence time. In the conventional forehearth of FIG. 1, the length D could be 15–20' or longer and could require up to an hour of residence time.

The heat exchanger 80 assists in the cooling function of the forehearth 10, and allows for rapid changes in cooling rate because it may be readily repositioned. For example a 15° C. temperature change may be made with a quickly settling transient by moving the heat exchanger one inch up or down. The radiative loss of the material 22 flowing over formed surface 20 is received and transferred away by heat exchanger 80. Radiation being more rapid than convection and conduction is less susceptible to long range transients and is more quickly corrected.

The heat exchanger 80 adds a control aspect which can be readily quantified, thereby reducing the skill required to regulate the forehearth operation. Since response time is reduced, long lasting transients are eliminated, making operation less complex. In addition, reduction of glass residence time, makes for better throughput, more efficient operation and beter quality product.

Figure 5:
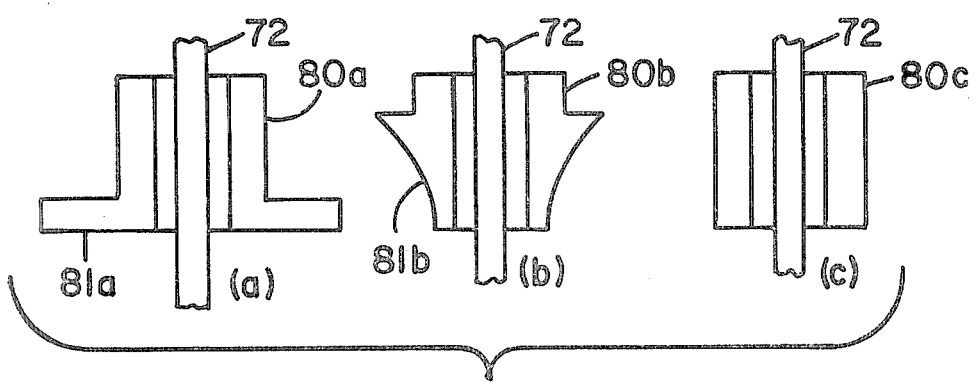
FIG. 5 is a schematic illustrating alternative heat exchange profiles.

Variations in the heat exchanger 80 are shown in FIG. 5. Illustration (a) in FIG. 5 is a heat exchanger 80a mounted on bell shaft 72 having one or more radially extending paddles 81a which could be joined forming a single annular paddle. In FIG. 5 at (b) heat exchanger 80b has a heat exchange surface 80b which is similar or complimentary to the formed surface 20. In FIG. 5 at (c) the heat exchanger 80c may be a single cylinder similar to the one shown in FIG. 2. Other shapes are possible for adaptation to the present invention. It should be noted that the arrangement of FIG. 2 is preferred since it can both be completely removed from the space 26 or brought into close proximity with the glass 22. Thus the working range of temperature control is wider.

Another aspect of the present invention which allows for a greater throughput of glass 22 stems from the fact that the glass 22 is well distributed over the formed surface 22. Cooling is fast compared to a conventional forehearth because the glass 22 is in the form of a relatively thin film (e.g. 0.5–2" as opposed to 6" or more in a conventional forehearth), and thus, heat can readily escape.

Additional energy for reheat is not normally required except as provided by the fresh supply of glass 46 from inlet 44. Volatilization is minimized because the space 26 above chamber 12 is stagnant, and enclosed and undisturbed by turbulence of burners. Space 26 is for practical purposes sealed or sealable so that the atmosphere may be saturated thereby suppressing further volatilization. The variable profile of the formed surface 22 from the first region 30 to second region 32 compensates for viscosity change due to cooling and allows the glass 22 to form a relatively uniform film thickness and uniform temperature profile. Thus, the glass 20 is conditioned and homogenized. The system also eliminates cord by providing a final mix during cool down. Even though flow is slow near the dwell 30, stagnation is prevented by wedge 33 which urges glass 22 towards the outlet 18. Further, since the glass 20 is not held long within the chamber its devitrification potential is reduced. By the same token, since the formed surface 20 has a dwell, glass 22 does not short circuit flow to the outlet 18.

A molybdenum or platinum liner might be utilized as a protective cover for formed surface 20. Molybdenum would require special precautions during startup to prevent oxidation, but such precautions would be worthwhile since molybdenum is an extremely good glass contact material.

While there has been described what are presently considered to be the preferred embodiments of the present invention, it will be obvious to those skilled in the art that various changes and modifications may be made therein without departing from the invention, and it is intended in the appended claims to cover all such changes and modifications as falls within the true spirit and scope of the invention.

We claim:

1. Apparatus for conditioning a supply of molten viscous material to at least one of a plurality of desired temperature and viscosity characteristics, wherein a delivery means conveys a stream of said material from the supply comprising:

a chamber in flow communication with the delivery means being mounted for rotation about an axis and having an inlet for receiving said stream of material therein; an outlet remotely located from and in flow communication with the inlet for allowing the material to flow from said chamber at a relatively uniform temperature and viscosity; and a flow control surface having a profile including at least two regions, each uniquely oriented for influencing the flow of material therealong such that in one region the material experiences delayed flow to enable it to give up heat to ambient and in the other region the material experiences accelerated flow to enable it to counteract changes in viscosity resulting from heat loss in the first mentioned region; and means operatively coupled to the chamber for rotating same, such that, a fresh supply of material at an elevated temperature is deposited circumferentially on the flow control surface, said fresh supply of material being relatively evenly distributed about the inlet to the chamber in order to moderate the heat loss in respect to the material under the influence of the flow control surface, whereby the material reaches the outlet at a desired temperature and viscosity.

2. The apparatus according to claim 1 further including forming means located at the outlet of the chamber for receiving a selected volume of said molten viscous material therein, and means at an outlet end thereof for delivering a formable stream of molten viscous material therefrom.

3. The apparatus of claim 1 wherein the profile of said formed surface has a continuously changing slope from the first region to the second region, said first region has a relatively horizontal dwell portion near the inlet, the second region has a relatively vertical portion near the outlet and said formed surface is curvilinear from said inlet to said outlet.

4. The apparatus of claim 3 wherein the dwell portion includes a peripheral wedge for urging the molten material inwardly of the chamber for preventing stagnation of same near the inlet.

5. The apparatus of claim 1 wherein the outlet includes a relatively narrow peripheral drip edge extending beyond the chamber for suppressing buildup of molten material thereabout.

6. The apparatus of claim 1 further including heat exchange means located at least partially within the chamber in heat exchange relation with the material for conducting heat given up thereby as it flows from the inlet to the outlet.

7. The apparatus according to claim 6 wherein the heat exchange means includes means for controlling the rate of heat transfer from the material to said heat exchange means including means for locating same in spaced relation with the material.

8. The apparatus of claim 7 wherein the heat exchange means includes free surface portions having a selected profile.

9. The apparatus according to claim 8 wherein the selected profile of the heat exchange means includes a surface having a shape corresponding to at least a portion of the control surface of the chamber.

10. The apparatus according to claim 9 wherein the heat exchange means has a free surface corresponding to at least one portion of a cone and a cylinder.

11. The apparatus according to claim 9 wherein the heat exchange means includes at least one heat regulating panel extending radially outwardly from a portion of said heat exchange means in spaced relation with the material.

12. The apparatus according to claim 1 wherein the temperature gradient of the molten viscous material as it is deposited at the inlet of the chamber is relatively nonuniform and becomes relatively homogeneous and uniform as it flows over said formed surface to the outlet by virtue of the relatively fresh supply of heated molten viscous material deposited at the inlet, the flowing of the material over the formed surface in heat exchange with the ambient and the influence of said formed surface.

13. The apparatus according to claim 1 wherein said chamber is rotated from about 3 to about 7 revolutions per minute.

14. The apparatus according to claim 2 wherein said means at the outlet end of said forming means includes an orifice for delivering a stream of said molten viscous material therefrom and a concentrically located bell and contiguous shaft for forming said stream in respect to said orifice into a tubular form.

15. The apparatus according to claim 2 further including heater means located in at least one of said chamber and forming means for regulating at least a portion of the temperature of said material.

16. The apparatus according to claim 15 wherein said heater means is located near an outlet of said chamber.

17. The apparatus according to claim 15 wherein said heater means is located near at least one of the outlets of said forming means and a central circumferential region of said forming means.

18. The apparatus according to claim 1 wherein said delivery means includes means for controlling the supply of molten viscous material.

19. The apparatus according to claim 2 wherein said forming means includes means for releasing selected volumes of said molten viscous material therefrom.

20. The apparatus of claim 2 wherein said forming means includes a reservoir for containing a selected volume of said material therein with a relatively uniform head over the outlet end thereof.

21. Apparatus of claim 1 wherein said chamber includes a cover extending thereover for stagnating atmosphere within a space above the chamber.

22. A method for conditioning molten viscous material from one of a plurality of selected temperature and viscosity conditions to a desired temperature and viscosity condition comprising the steps of delivering said material to a formed surface, dwelling said material on said formed surface to delay flow thereof, allowing said material to thereafter accelerate towards an outlet, heat exchanging said material as it flows from the dwell to the outlet, rotating said surface about an axis, continuously supplying additional material at an elevated temperature as said surface is rotated and moderating the temperature of said flowing material by virtue of the continuously supplied material.

23. The method of claim 22 further including the steps of, evenly distributing said stream of molten viscous material on said formed surface and controlling surface rotation to a relatively slow angluar velocity.

24. The method of claim 22 further including the steps of, delivering said material from the outlet of said formed surface to a reservoir forming means and containing said material in said forming means at a relatively uniform head.

25. The method of claim 22 further including the step of stagnating an atmosphere above the formed surface to thereby prohibit volatilization of selected constituents of the material.

* * * * *

UNITED STATES PATENT AND TRADEMARK OFFICE
CERTIFICATE OF CORRECTION

PATENT NO. : 4,247,320
DATED : January 27, 1981
INVENTOR(S) : Bihari Bansal & George B. Boettner It is certified that error appears in the above-identified patent and that said Letters Patent are hereby corrected as shown below:

Column 3, line 3, "condition" should read --conditioning--.

Column 4, line 50, "relaively" should read --relatively--.

Column 5, line 42 "temperarture" should read --temperature--.

Column 6, line 4, "belt" should read --bell--.

Column 6, line 15, "oridice" should read --orifice--.

Column 6, line 42, "preferbly" should read --preferably--.

Column 7, line 4, "beter" should read --better--.

Column 7, line 11, "80b" (second occurrence) should read --81b--.

Column 7, line 57, "has" should read --have--.
Column 7, line 63, "falls" should read --fall--.

Signed and Sealed this

*Fifth* Day of *May 1981*

[SEAL]

Attest:

RENE D. TEGTMEYER

*Attesting Officer*   *Acting Commissioner of Patents and Trademarks*